United States Patent
Truong et al.

(10) Patent No.: US 7,908,369 B2
(45) Date of Patent: Mar. 15, 2011

(54) METHOD OF COLLECTING DESCRIPTIONS OF STREAMS PERTAINING TO STREAMS RELATING TO AT LEAST ONE CLIENT NETWORK ATTACHED TO AN INTERCONNECTION NETWORK

(75) Inventors: Patrick Truong, Lannion (FR); Emile Stephan, Pleumeur Bodou (FR); Frederic Boucaud, Louannec (FR)

(73) Assignee: France Telecom, Paris (FR)

( * ) Notice: Subject to any disclaimer, the term of this patent is extended or adjusted under 35 U.S.C. 154(b) by 133 days.

(21) Appl. No.: 12/279,625

(22) PCT Filed: Feb. 14, 2007

(86) PCT No.: PCT/FR2007/050800
§ 371 (c)(1),
(2), (4) Date: Aug. 15, 2008

(87) PCT Pub. No.: WO2007/099245
PCT Pub. Date: Sep. 7, 2007

(65) Prior Publication Data
US 2009/0055529 A1    Feb. 26, 2009

(30) Foreign Application Priority Data
Feb. 28, 2006 (FR) ..................... 06 50695

(51) Int. Cl.
*G06F 15/16* (2006.01)
*G06F 15/173* (2006.01)
*G06F 15/177* (2006.01)

(52) U.S. Cl. ........ 709/224; 709/217; 370/392; 370/473; 370/229; 370/230; 370/235; 370/252

(58) Field of Classification Search .......... 709/217–228; 370/392, 473, 229, 230, 235, 252
See application file for complete search history.

(56) References Cited

U.S. PATENT DOCUMENTS

| 6,651,099 | B1 | 11/2003 | Dietz et al. |
| 7,634,169 | B2 * | 12/2009 | Gegout et al. .................... 386/46 |
| 2002/0181462 | A1 * | 12/2002 | Surdila et al. ................. 370/392 |
| 2003/0133443 | A1 | 7/2003 | Klinker et al. |
| 2005/0041688 | A1 * | 2/2005 | Bernhard et al. ............. 370/473 |
| 2005/0044265 | A1 * | 2/2005 | Vinel et al. .................... 709/238 |

(Continued)

FOREIGN PATENT DOCUMENTS
WO      03 009160      1/2003

*Primary Examiner* — Haresh N Patel
(74) *Attorney, Agent, or Firm* — Oblon, Spivak, McClelland, Maier & Neustadt, L.L.P.

(57) ABSTRACT

A method for collection of flow descriptions for flows relating to at least one client network, the client network being attached to an interconnection network. The method receives flow descriptions for flows coming from the client network, aggregates the flow descriptions for the flows coming from the client network as a function of an aggregation criterion, transmits the aggregated flow descriptions to a collection device, analyzes the flow descriptions for the flows coming from the client network to determine at least one flow characteristic specific to the client network, receives flow descriptions for flows coming from the interconnection network, filters the flow descriptions for the flows coming from the interconnection network, in which the flow descriptions for flows lacking the at least one determined flow characteristic specific to the client network are eliminated, and transmits the filtered flow descriptions to the collection equipment.

10 Claims, 3 Drawing Sheets

U.S. PATENT DOCUMENTS

| | | | |
|---|---|---|---|
| 2005/0111367 A1* | 5/2005 | Chao et al. | 370/235 |
| 2005/0141417 A1* | 6/2005 | Huang et al. | 370/229 |
| 2006/0221956 A1* | 10/2006 | Narayan et al. | 370/389 |
| 2007/0118609 A1* | 5/2007 | Mullan et al. | 709/217 |
| 2007/0153689 A1* | 7/2007 | Strub et al. | 370/230 |
| 2007/0261041 A1* | 11/2007 | Amini et al. | 717/148 |
| 2008/0235685 A1* | 9/2008 | Amini et al. | 718/100 |
| 2009/0073891 A1* | 3/2009 | Duffield et al. | 370/252 |
| 2009/0119238 A1* | 5/2009 | Amini et al. | 706/46 |
| 2010/0064032 A1* | 3/2010 | Vinel et al. | 709/220 |

* cited by examiner

METHOD OF COLLECTING DESCRIPTIONS OF STREAMS PERTAINING TO STREAMS RELATING TO AT LEAST ONE CLIENT NETWORK ATTACHED TO AN INTERCONNECTION NETWORK

The invention relates to a method for collection of flow descriptions for flows associated with at least one client network attached to an interconnection network.

The monitoring of communications networks is a constant need for the network operators. It may be categorized into various applications such as attack detection of the 'Denial of Service', or DoS, type, monitoring of the network in terms of the traffic routed via the various nodes of the network or, as another example, the monitoring of a client network attached to a core network.

It will be noted, first of all, that a flow corresponds to an exchange of packets of data between two machines of an IP network whose packets have common characteristics, and notably common characteristics of origin, destination and of service. These characteristics are henceforth referred to as flow characteristics.

For the monitoring of a network, a known solution is to implement a global analysis service for flows transiting through a network over the nodes responsible for the routing within this network. Starting from measurements referred to as passive and based on the observation of the flows entering these nodes, descriptions of incoming flows are generated. These flow descriptions are transmitted to a collection device by means of a specific protocol. This may, for example, be the IPFIX protocol, which is in the process of standardization within the IETF (Internet Engineering Task Force), or any other protocol.

Each flow possesses a flow identification which is formed for example by means of the following elements:
  IP address of the source node;
  IP address of the destination node;
  the source and destination ports, for the TCP segments and the UDP datagrams;
  the protocol used, obtained by analysis of the information in the IP layer, for example TCP, UDP or ICMP;
  the TOS (Type of Service) field identifying the type of quality of service required for the flow (flow priority, route time, etc.);
  the Input field which corresponds to an index of the interface via which the flow has entered the node, this index being defined for the administration of the network.

When a node receives a data packet to be routed containing, for certain identification elements mentioned hereinabove, unknown values, it initiates a flow description by adding to the identification of the flow various elements allowing the flow to be described, such as:
  the number of the Output interface, this index being defined for the administration of the network;
  DPkts, containing the number of packets counted for this flow;
  DOctets, containing the volume of level 3 octets (IP layer) in the flow packets;
  First and Last, respectively corresponding to the start and end times of the flow.

Upon receiving each new packet of data, the node updates the parameters DPkts, DOctets and Last.

After a given period of inactivity of the flow, or else periodically, the node transmits to the collection equipment the descriptions relating to this flow, which it has itself generated. The quantity of data thus transmitted may prove to be significant and induce a high load in the collection network, which is all the more difficult to manage the larger the size of the network.

In order to reduce the quantity of data sent to the collection equipment, a known solution is to implement within the nodes a function for aggregation of the flow descriptions, which has the role of aggregating the flow descriptions according to an aggregation criterion. This criterion may consist, for example, in aggregating the flow descriptions relating to a set of source IP addresses. These aggregated flow descriptions are then transmitted to the collection equipment.

Depending on the monitoring application for which the aggregated flow descriptions are destined, the aggregation must satisfy different constraints. By way of example:
  in order to analyze the IP traffic, it is essential that the aggregation allows the information relating to the source and destination ports to be conserved;
  for detection of attacks by denial of service, the aggregation must allow the information relating to the number of packets sent to a server to be conserved in order to be able to analyze the variation of this volume; and
  for applications aiming to generate traffic matrices, the aggregation is carried out on an autonomous system or else on network sub-assemblies.

The node can only carry out a very limited number of aggregations at once. In order to overcome this problem, the node transmits the same flow descriptions in parallel to the collectors of the various devices more specifically in charge of the various monitoring applications. This leads to an additional work load for the node whose main function remains the routing of the data packets. In order to limit this load, the nodes are generally limited to two parallel exports of flow descriptions.

The object of the invention is therefore to limit the volume of the aggregated descriptions transmitted to the collection equipment, notably in the framework of the monitoring of a client network attached to an interconnection network.

For this purpose, the invention relates to a method for collection of flow descriptions for flows relating to at least one client network, the client network being attached to an interconnection network, the method comprising:
  a first step for receiving flow descriptions, said flow descriptions being for flows coming from the client network;
  a first step for aggregation of the flow descriptions for the flows coming from the client network according to an aggregation criterion;
  a first step for transmission of the aggregated flow descriptions to a collection device;
characterized in that it also comprises:
  a step for analyzing the flow descriptions for the flows coming from the client network in order to determine at least one flow characteristic specific to the client network;
  a second step for receiving flow descriptions, said flow descriptions being for flows coming from the interconnection network;
  a step for filtering the flow descriptions for the flows coming from the interconnection network, in which the flow descriptions for flows lacking said at least one determined flow characteristic specific to the client network are eliminated;
  a second step for transmission of the filtered flow descriptions to the collection equipment.

Based on the flow descriptions for flows coming from the client network and depending on the interfaces of the client network defined as being to be observed, the method determines at least one flow characteristic and automatically configures the processing operations to be carried out on the flow descriptions for flows coming from the interconnection network. As far as the descriptions of flows coming from the interconnection network are concerned, these are subjected to a filtering in order to conserve only those corresponding to the flow characteristic determined. Thus, the volume of the information transmitted to the collection equipment is reduced. In order to obtain all of the flows sought, the descriptions of flows coming from various nodes of the interconnection network must be obtained because the paths used for the incoming flows and outgoing flows of the client network are not necessarily the same.

The loads on the collection network and on the collection equipment are also reduced since only the useful information is transmitted.

The method also exhibits a greater flexibility because a different aggregation criterion per observed client can be defined.

Thus, all of the information necessary for the monitoring applications, and only that, is obtained without increasing the processing load on the nodes that produce these low-level flow descriptions.

Advantageously, the method also comprises a second step for aggregation of the filtered flow descriptions according to the aggregation criterion.

Prior to transmission of the flow descriptions for the flows coming from the interconnection network and destined for the client network, the filtered flow descriptions, in other words those corresponding to the determined flow characteristic or characteristics, are aggregated. The load on the nodes is thus further reduced since they are not in charge of the aggregation of all the flow descriptions.

In one embodiment, the first aggregation step also comprises a sub-step for assigning to the aggregated flow descriptions a parameter for identification of an aggregation request and the step for filtering the flow descriptions comprises a sub-step for assigning to the filtered flow descriptions the same aggregation request identification parameter.

The use of the same identification parameter in the aggregated flow descriptions for flows coming from the client and in the filtered or aggregated flow descriptions for flows coming from the interconnection network subsequently allows the collection equipment to pick out the flow descriptions corresponding to the same aggregation request.

In one embodiment, the method also comprises a third aggregation step, said step consisting in aggregating the aggregated flow descriptions for the flows coming from the client network and the aggregated flow descriptions coming from the interconnection network in order to obtain bi-directional aggregated flow descriptions before transmission to the collection equipment.

Thus, the aggregated flow descriptions for the flows coming from various nodes of the interconnection network and the aggregated flow descriptions for the flows coming from the connecting nodes of the client network are aggregated into bi-directional flow descriptions. For this reason, the method of the invention provides an overall view of the traffic on the client network.

Preferably, a step is also provided for assigning to the flow descriptions for the flows coming from the client network and to the flow descriptions for the flows coming from the interconnection network a parameter representative of a direction of transmission between a client and a server, upload direction from the client to the server and download direction from the server to the client, depending on the respective values of the source and destination ports contained in said flow descriptions, and during the first and second aggregation steps, the flow descriptions are aggregated according to said parameter representative of the direction of transmission and to the aggregation criterion.

In a flow description, the port whose value is the lowest between the source and destination ports is identified. This port corresponds to that of the server (whether the server is in the client network or in another network), the other to the port of the client (in the client-server architecture). Aggregated information is therefore obtained that preserves the essential elements allowing effective monitoring to be achieved. The information on the application direction of the flows enables a quick reaction if it is observed, for example, that the incoming and outgoing flows are asymmetrical. This may be an indication of an attack in progress on the client network or of a malfunction in a server.

The invention also relates to a system for collection of flow descriptions for flows relating to at least one client network, the client network being attached to an interconnection network, the system comprising:
   at least one flow description reception module configured for receiving flow descriptions for flows coming from one of the two networks, interconnection or client;
   at least one flow description aggregation module, configured for aggregating received flow descriptions as a function of an aggregation criterion;
   a flow description analysis module, configured for analyzing flow descriptions for flows coming from the client network in order to determine at least one flow characteristic specific to the client network;
   a flow description filtering module, configured for eliminating, within the received flow descriptions, those for flows lacking said at least one determined flow characteristic;
   a flow description transmission module, configured for transmitting descriptions of filtered flows to a collection module.

The invention will be better understood by means of the following description of one particular embodiment of the method of the invention, with reference to the appended drawings in which.

It will first of all be noted that a flow corresponds to an exchange of packets of data between two machines of an IP network whose packets have common characteristics, notably common characteristics of origin, of destination and of service. These characteristics are henceforth referred to as flow characteristics.

Figure 1:
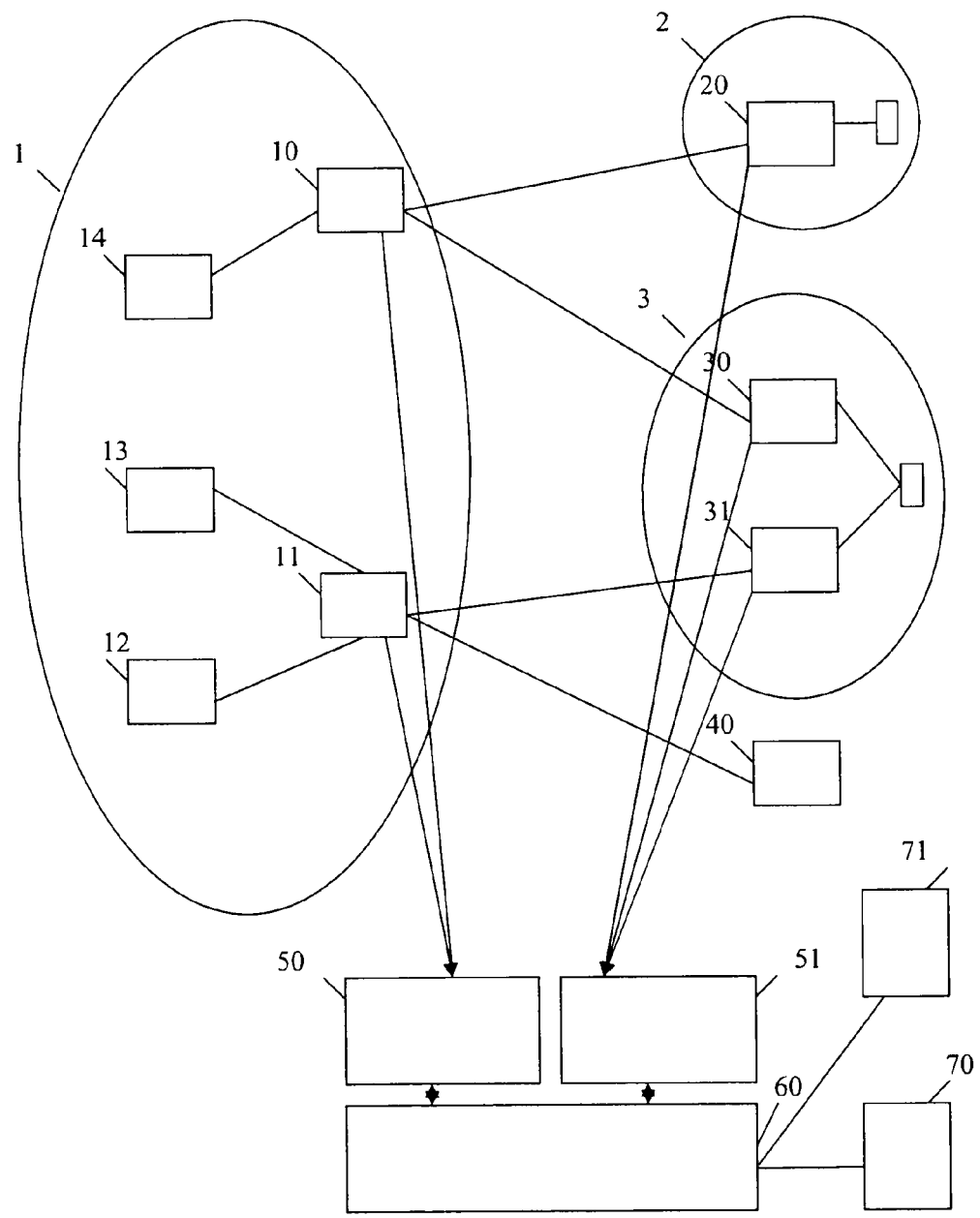
FIG. 1 shows a plurality of client networks attached to an interconnection network together with a system for collection of the flow descriptions.

FIG. 1 shows two client networks 2 and 3 attached to an interconnection network 1. The interconnection network is in charge of the routing of the flows destined for the client networks. This corresponds for example to the infrastructure of a telecommunications operator. A client network can for example be a company network, a domestic network, a mobile network, a virtual private network (VPN) based on MPLS (MultiProtocol Label Switching), a VLAN (Virtual Local-Area Network), etc. In the example in FIG. 1, the interconnection network is a core network 1 comprising a plurality of nodes 10, 11, 12, 13 and 14 in charge of the routing of the packets between a source machine address and a destination machine address. The nodes 10 and 11 are output nodes of the core network 1 managing interfaces to the client networks 2 and 3 or to a client node 40. The client node 40 does not belong to the client networks 2 and 3.

The packets destined for an IP address belonging to the client network 2 are routed within the core network 1 to the output node 10. The node 10 then transmits the packets to a node 20 of the client network 2. In the example, the IP addresses of the network 2 correspond to addresses belonging to the set 156.100.140.0 to 156.100.140.255, in other words 156.100.140.0 with a mask of 24, denoted 156.100.140.0/24. This is CIDR (Classless Inter-Domain Routing) notation allowing a range of IP addresses to be identified. The IP address before the forward slash "/" is the first address of the range. The value situated after the forward slash "/" corresponds to the number of address bits allocated to the client network for assigning an IP address to its machines.

The full set of the addresses of the client network is henceforth referred to "network prefix".

The packets emitted by a machine on the client network 2 are transmitted via the node 20 to the node 10 of the core network 1.

The packets destined for an IP address belonging to the client network 3 are routed within the core network 1 to the output nodes 10 and 11. The node 10 then transmits the packets to a node 30 of the network 3 of the client. The node 11 then transmits the packets to a node 31 of the network 3 of the client. In the example of the first embodiment, the IP addresses of the network 3 correspond to the set of the addresses with prefix 140.100.140.0 with a mask of 24, denoted 140.100.140.0/24, and to the set of addresses with prefix 139.100.140.0 with a mask of 24, denoted 139.100.140.0/24. More particularly, in the core network 1, the packets destined for the prefix 139.100.140.0/24 are routed to the node 10 and those destined for the prefix 140.100.140.0/24 to the node 20. The packets emitted by a machine on the network 3 are transmitted either via the node 30 to the node 10 of the core network 1, or via the node 31 to the node 11 of the core network 1 in load-sharing mode. The IP addresses of the nodes 20, 30 and 31 are respectively 192.3.2.1, 192.3.2.2 and 192.3.2.3. The IP addresses of the nodes 10 and 11 are respectively 192.3.2.4 and 192.3.2.5.

In the embodiments described, the nodes 10, 11, 20, 30 and 31 offer the possibility of activating, on request, measurements of flow descriptions for incoming flows into the node. These measurements may be activated, for example, for all the flows entering the node or for the flows entering through certain of the interfaces of the node only. These measurements are then transmitted to a collection device. According to the invention, the measurements are transmitted by means of a protocol of the IPFIX type, normalized to the IETF, to intermediate collection devices 50, 51 and 60 before being transmitted to a final collection device 70. The intermediate collection devices 50 and 51 are henceforth referred to as pre-aggregators and the intermediate collection device 60, an aggregator. These various collection devices dialog between themselves by means of a protocol of the IPFIX type.

A server 71 allows dialog with the aggregator 60 in order to notably enable the configuration of the collection system, which will be described hereinbelow.

Figure 2:
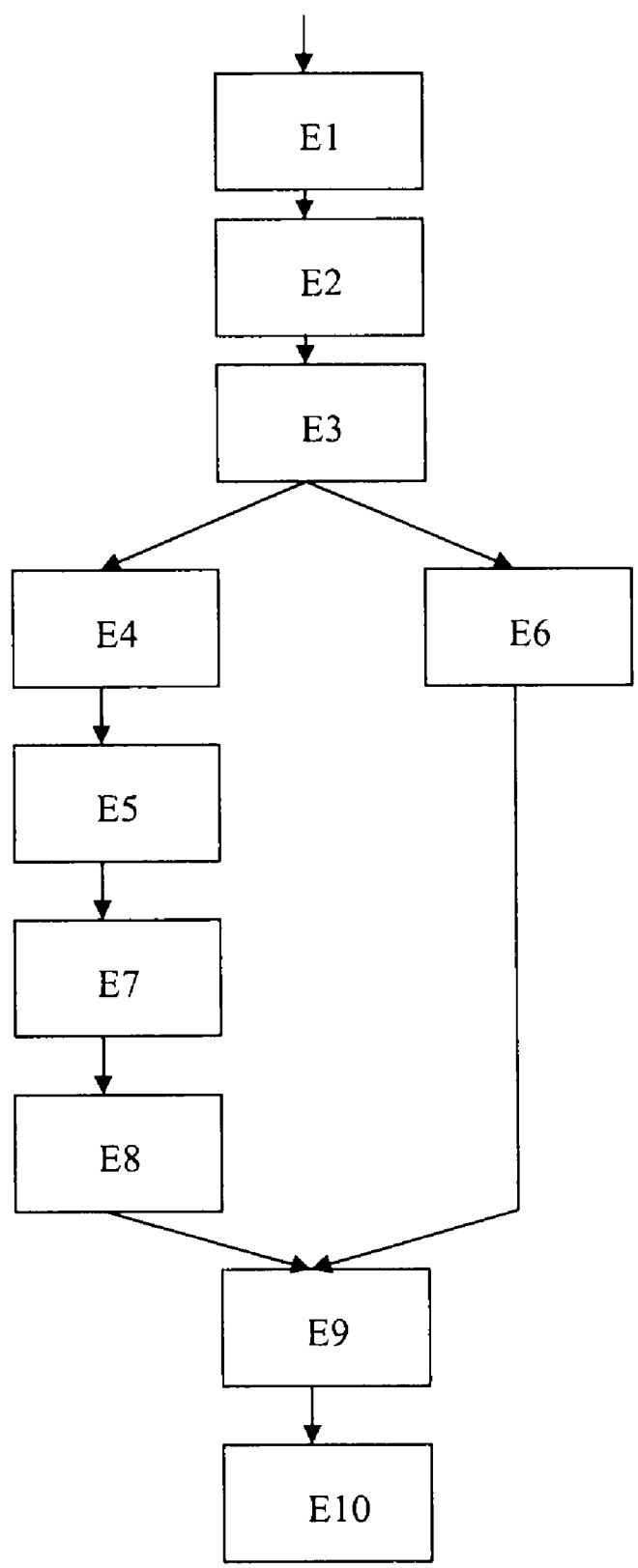
FIG. 2 shows the steps of the method for collection of flow descriptions for flows relating to at least one client network according to one particular embodiment of the invention.

The method for collection of flow descriptions for flows relating to a client network will now be described with reference to FIG. 2. In the example of the first embodiment described here, the two client networks 2 and 3 are jointly supervised. The client node 40 is unsupervised.

In a first configuration step E1, the server 71 transmits a request to the aggregator 60. This request contains an aggregation criterion AggrMode, the information identifying one or more nodes responsible for exporting the flow descriptions and the list of the interfaces to be observed for each of these nodes together with a type associated with these interfaces according to whether it is an interface for outgoing flows from the client network 2 or 3 or an interface for outgoing flows from the interconnection network 1. Optionally, the request comprises, for each client network, an aggregation request identification parameter AggrID. In the example in question, the interfaces are for nodes of the client networks 2 and 3, in this case those for the nodes 20 of the client network 2 and those for the nodes 30 and 31 of the client network 3. Two requests in this table have the same identification parameter in order to subsequently facilitate the regrouping of the data from the client network 3, this client network 3 possessing two output interfaces.

Table I lists the requests made to the aggregator 60 in the example of the first embodiment. All of the tables are presented in the Appendix.

In table I, it will be noted that:
- "Client1" and "Client2" respectively correspond to the client networks 2 and 3.
- "Node1" corresponds to the identity of the node 20, "Node2" to that of the node 30 and "Node3" to that of the node 31.
- "Export address" corresponds to the address of the node responsible for exporting the flow descriptions.
- "InterfaceId" corresponds to the identification of the interface to be observed.
- "Aggrmod" corresponds to an aggregation criterion used to define the type of aggregation to be carried out. Its operation is described in the description of step E6 for aggregation of the flow descriptions.

As a variant to this step E1, the aggregator 60 could identify the interfaces to be observed by reading the administration databases associated with the nodes.

Following this configuration step E1, in a second configuration step E2, the aggregator 60 transmits a pre-aggregation request to a pre-aggregator. The request is transmitted to the pre-aggregator(s) responsible for the collection of the flow descriptions coming from the node managing one of the interfaces to be observed belonging to the list of the node interfaces to be observed, transmitted by the server 71 (or determined by the aggregator 60 in the variant embodiment) in step E1. In the example in question, it is the pre-aggregator 51 that is responsible for the collection of the flow descriptions for flows coming from the client networks 2 and 3.

In a first variant, the flow description mechanism is continuously activated on all of the interfaces of the nodes.

In a second variant, the flow description mechanism is activated on the nodes 20, 30 and 31 by the pre-aggregator 51 or by the aggregator 60 by a protocol of the IPFIX type.

The pre-aggregator 51 is then configured for determining at least one flow characteristic by analysis of the flow descriptions for the flows coming from the client networks 2 and 3 and for aggregating these flow descriptions according to the aggregation criterion.

In a third step E3 for receiving flow descriptions, the pre-aggregator 51 receives flow descriptions for flows coming from the client networks 2 and 3, in the particular example, sent by the nodes 20, 30 and 31.

In the first embodiment, the pre-aggregator 51 receives the information contained in table II.

In table II, the field "exporter" corresponds to the IP address of the node that has sent the flow descriptions. The other fields correspond to the description of the flow.

Following the reception of flow descriptions in step E3, in a fourth step E4 the pre-aggregator 51 analyzes the flow descriptions for flows coming from the client network 2 or 3 according to the information received at the configuration step E1 in order to determine, for each client network to be observed 2 or 3, at least one flow characteristic. In the first embodiment, it thus deduces the characteristics of this client network, in particular, the IP prefix or prefixes of the client network and the autonomous system to which the client network belongs. These characteristics are specific to the client network. The information relating to the network mask and to the autonomous system of the client network are contained in the transmitted flow descriptions. The information relating to the mask appears in the field "Src Mask" of table II. For the sake of clarity, the information relating to the autonomous system, contained in the flow descriptions received by the pre-aggregator 51, does not appear in table II.

In the example in question, the analysis of table II allows the information contained in table III to be determined.

When this step E4 has been carried out, the pre-aggregator 51 knows at least one of the flow characteristics to be observed.

In a fifth step E5 for transmission of flow characteristics, the pre-aggregator 51 transmits the flow characteristic or characteristics to be observed, determined in step E4, to the aggregator 60. In the particular example, this is information contained in table III. When this step E5 is complete, the aggregator 60 has knowledge of the flow characteristic or characteristics to be observed.

In parallel, in a sixth step E6 for aggregation of the flow descriptions, the pre-aggregator 51 aggregates the flow descriptions according to the aggregation criterion AggrMod that it received in step E1.

In the particular example described here, the aggregation criterion is a combination of two parameters "minport" and "PrefixSrc", "minport" representing the smallest of the source and destination ports and "PrefixSrc" representing the network prefix of the source of the flow. The aggregation on the basis of such a criterion is described hereinafter.

In a first sub-step E61, for each row of table II, the pre-aggregator 51 determines the smallest of the two ports, between the source port and destination port of the flow, this information being included in the description of the flow in the fields SrcPort and DstPort. If the destination port corresponds to the value determined as being the smallest, the flow will be considered as being uploaded between a client and a server. If the source port corresponds to the value determined as being the smallest, the flow is considered as being downloaded between a server and a client. The pre-aggregator keeps the smallest value and assigns to the flow description a parameter representative of a direction of transmission—upload or download—between a client and a server. Table IV contains the information from table II following this sub-step E61.

Following this sub-step E61 and in a second sub-step E62, the pre-aggregator 51 aggregates the flow descriptions according to the aggregation criterion transmitted in step E1. In the first embodiment, the aggregation criterion corresponds to the combination of "MinPort" and PrefixSrc". It thus groups together into a single aggregated flow description all of the flow descriptions relating to respective ports (MinPort) covered by the same IP prefix of the client network and to the same direction of transmission (upload or download), sent by the same node identified by the field "exporter" of the flow description. The information contained in the field relating to the destination address of the flow DestAddr are not kept in the aggregated flow descriptions. The values contained in the fields "bytes" and "pkts" are cumulated into respective aggregated fields.

Optionally, an identification parameter for the aggregation is assigned to the aggregated flow description. These parameter values were transmitted in the configuration step E1 in the field AggrID. In the example described, the aggregated flow descriptions are contained in table V.

Optionally and depending on the value of the aggregation criterion, the pre-aggregator 51 assigns to the aggregated flow description a time parameter representative of the distribution over time of the flow descriptions that have been aggregated. This may, for example, be the smallest value from amongst the set of values contained in the fields "First" of the flow descriptions having been aggregated (this field "First" corresponding to the flow start time), and the largest value from amongst the set of values contained in the field "Last" of the flow descriptions having been aggregated (the field "Last" corresponding to the flow end time).

Following the sub-step E62, in a sub-step E63 the pre-aggregator 51 transmits the aggregated flow descriptions to the aggregator 60.

Step E6 for aggregation of the flow descriptions is only carried out for the flow descriptions corresponding to the outgoing flows from the client network. Thus, the transmission of aggregated flow descriptions is limited solely to the outgoing flows from the client network (and hence incoming onto the interconnection network). No flow descriptions are transmitted for unobserved client networks.

Following the reception of the flow characteristics specific to the client network to be observed during step E5, in a seventh configuration step E7, the aggregator 60 configures the pre-aggregator 50 by transmitting to it the characteristics to be observed, in particular, the nodes managing one of the interfaces to be observed belonging to the list of the node interfaces to be observed, the flow characteristic or characteristics that it obtained in step E5 and the aggregation criterion. Optionally, it transmits the aggregation identification parameter.

As a variant, in step E5, the pre-aggregator 51 transmits these characteristics directly to the pre-aggregator 50 and step E7 is not carried out.

Following the reception of these characteristics in step E5 or step E7, the pre-aggregator 50 activates the aggregation of the flow descriptions for flows coming from the interconnection network 1 depending on the received flow characteristic or characteristics and according to the aggregation criterion, as is described hereinafter.

In an eighth step E8 for filtering and aggregation of the flow descriptions and, more particularly, in a sub-step E81 for receiving flow descriptions, the pre-aggregator 50 receives flow descriptions for flows coming from the interconnection network 1, sent by the nodes 10 and 11 in the particular exemplary embodiment, and in a sub-step E82, filters the flow descriptions received in order to eliminate those whose flow characteristic corresponding to the flow characteristic specific to the client network received is not covered by the latter. These are flow descriptions for flows lacking the flow characteristic specific to the client network determined. In the first embodiment, it eliminates those whose destination address is not covered by one of the network prefixes determined for the client network. Optionally, it assigns the aggregation identification parameter to each flow description. In the example described, the flow descriptions filtered by the pre-aggregator 50 are contained in table VI.

These filtered flow descriptions are then processed in the same way as in step E6. During a sub-step E83, the pre-aggregator 50 assigns to the filtered flow descriptions a parameter representative of a direction of transmission—upload or download—between a client and a server. In a sub-step E84, it then aggregates all of the flow descriptions filtered according to the aggregation criterion into a single flow description.

In the first embodiment, these are the flow descriptions relating to one of the network prefixes determined for the client network 2 or 3 and to the same direction of transmission—upload or download—sent by a node identified by the field "exporter" in the flow description.

In the example described, the aggregated flow descriptions are contained in table VII.

During a sub-step E85, the pre-aggregator 50 then transmits the aggregated flow descriptions to the aggregator 60.

Following steps E6 and E8, in a ninth aggregation step E9, the aggregator 60 aggregates the flow descriptions received from the pre-aggregator 51 in step E6 and those received from the pre-aggregator 50 in step E8 into bi-directional aggregated flow descriptions, as described hereinafter.

In the first embodiment, for each aggregated flow description coming from the pre-aggregator 51 containing as source address one of the IP prefixes determined for the client network 2 or 3, the aggregator searches in the other aggregated flow descriptions coming from the same pre-aggregator 51 to see whether there exists one of them also containing the same IP prefix as source address. If the transmission direction parameter assigned to the flow description has the same value as that assigned to the flow description coming from the pre-aggregator 51, it aggregates the two flow descriptions. It then searches in the aggregated flow descriptions coming from the pre-aggregator 50 to see whether there exists one of them containing the same IP prefix as destination address. If the transmission direction parameter assigned to the aggregated flow description coming from the pre-aggregator 50 is opposite to that assigned to the aggregated flow description coming from the pre-aggregator 51, the other parameters of the flow description being similar, the aggregator 60 aggregates the two flow descriptions into one bi-directional aggregated flow description. The aggregations are carried out taking timing information into account in order to only aggregate flow descriptions included within the same time interval. This generation of bi-directional flow descriptions is facilitated by the use of the aggregation identification parameter for the request, AgrrID, which allows the aggregated flow descriptions originating from various pre-aggregators, relating to the same request, to be detected.

In the example in question, starting from the aggregated flow descriptions contained in tables V and VII, the aggregator 60 generates bi-directional flow descriptions contained in tables VIII and IX. Table VIII corresponds to the descriptions of flows toward servers external to the client network 2 or 3. This bi-directional aggregation of the flow descriptions corresponds to download flows. Table IX corresponds to the descriptions of flows toward servers present in the client network 2 or 3, in other words to upload flows. The Ag2 flow descriptions of the TCP flow exhibit a notable dissymmetry, which leads to the assumption that the servers of the client network 3 are being subjected to a TCP attack.

The information relating to the nodes having transmitted the flow descriptions may be conserved but is not indicated in tables VIII and IX for the sake of readability.

Other forms of presentation of the bi-directional flow descriptions are also possible. It will also be noted that the aggregated flow descriptions have the advantage of masking the addressing planes internal to the client network.

Following this step E9, during a step E10, the bi-directional flow descriptions are then transmitted to a collection device 70. The parameters of this transmission are settable: this can be done as they arise or when certain values exceed a threshold. Advantageously, the aggregation includes over-threshold detections by comparison of values included in the bi-directional flow descriptions. This may be a comparison between the number of incoming packets and the number of outgoing packets. It may also be threshold detection on certain parameters such as the number of packets or the volume of bytes.

Aside from the steps linked to the configuration of the whole collection system, the method is continuous, in other words the steps E3 for reception of flow descriptions, E6 for aggregation of the flow descriptions, E8 for filtering and aggregation of the flow descriptions and E9 for aggregation are carried out in a continuous fashion as soon as flow descriptions corresponding to the flows observed are received from the nodes.

The first embodiment is described by using as aggregation criterion a value consisting in assigning a parameter representative of a direction of transmission between a client and a server depending on the source port and of the destination port contained in the flow descriptions and in then aggregating the flow descriptions by source IP prefix in the pre-aggregator 51 processing the flow descriptions for flows coming from the client network 2 or 3 and by destination IP prefix in the pre-aggregator 50 processing the flow descriptions for flows coming from the core network.

Other modes of aggregation, based on other criteria, may also be envisioned, notably, without the following list being exhaustive:
   aggregation according to the source network prefix (AggrMode="PrefixSrc") or of the destination network prefix (AggrMode="PrefixDst");
   assignment of a parameter representative of a direction of transmission followed by aggregation according to the source port (AggrMode="MinPort");
   assignment of a parameter representative of a direction of transmission followed by aggregation according to the destination IP prefix (AggrMode="MinPort+PrefixDst").

Depending on the type of client network to be observed, the assignment of a parameter representative of a direction of transmission between a client and a server is not carried out in the same way. Generic values of source ports are reserved for the servers in a range from 0 to 1023: for example, the value of 80 corresponds to http, 12 to TCP, 21 to FTP, 161 to SNMP Polling and 162 to the emission of SNMP alarms. In a network of the P2P (Peer-to-Peer) coverage type, the assignment of the port numbers to the servers is dynamic. The port of the server is shared by all of the clients. So, by analysis of the flow descriptions received, the association IP address/server port can be identified and the server port used deduced from this in a dynamic manner. On the other hand, flow descriptions relating to virtually contiguous ports can equally be aggregated based on the assumption that the dynamic assignment by a server to clients is carried out in this manner.

The first embodiment is described in the case where the load is distributed between the various nodes. It may also be envisioned that only the nodes at the output of the client network transmit the flow descriptions coming from and destined for the client network.

In a second embodiment, the method allows multicast flows to be observed.

In "Broadcast" mode, it may for example be a question of television broadcast or information broadcast. The transmission source is situated within the observed client network. The flows coming from the client network are destined for an address referred to as multicast. The core network is responsible for the re-broadcasting of the flows destined for the multicast address to the various addresses of the unicast IP terminals having requested, by means of the IGMP protocol (Internet Group Management Protocol), to receive the flows. It manages a multicast broadcast tree. The pre-aggregator 51 detects the multicast destination address on an output interface of the client network by analyzing the flow descriptions for flows coming from the client network. Depending on the type of application envisioned, two different modes of aggregation may be identified.

In a first variant, the goal is to determine the Multicast tree, managed by the core network, associated with the multicast address. In this case, the aggregation criterion is defined at the value "broadcastTree". In step E4 for analyzing the flow descriptions for flows coming from the client network, the pre-aggregator 51 analyzes the flow descriptions in order to determine at least the address of the unicast source and/or the multicast destination address. These characteristics are specific to the client network. In step E5, it transmits these determined flow characteristics to the aggregator 60. In step E62 for aggregation of the flow descriptions for flows coming from the client network, the pre-aggregator 51 aggregates the flow descriptions for the flows whose source and destination addresses correspond to the pair {unicast source address, multicast destination address}. In step E7, the aggregator 60 configures pre-aggregators in charge of flow descriptions for flows coming from the core network by supplying them with the information determined on the flow and the aggregation criterion. In step E8, the pre-aggregators supply the aggregated flow descriptions depending on the determined flow characteristics. They transmit, associated with the aggregated flow descriptions, a list of nodes ("Exporter" field) which corresponds to the nodes via which the multicast flow has been routed. Based on the information contained in the aggregated flow descriptions and, in particular, the routing information presented within this (identification of the next router for the routing, the identification of the autonomous system, etc.), the application can determine the tree of the multicast flow. By symmetry, this variant is also applicable to the discovery of the tree of the multicast flow, since the multicast source is broadcast in the client network.

In a second variant, the goal is to estimate the audience for a multicast service from a broadcast source situated within the client network or else to observe its distribution by network. In this case, the aggregation criterion is defined at the value "broadcastListener". Steps E4, E5, E62 and E8 are identical to the first variant. In step E7, the aggregator configures pre-aggregators in charge of flow descriptions for flows coming from access networks by supplying them with the determined flow characteristics and the aggregation criterion. Based on the flow descriptions received in step E8, the application thus determines a list of multicast access nodes and/or of broadcast nodes at the terminals to be interrogated in order to subsequently obtain the number of multicast sessions associated with this source. This allows a good instantaneous estimate of the audience by simple cumulation of the sessions.

In one "Multicast" mode, it may also be a question of multi-directional traffic, for example for audio-conference or other. The application aims to determine the list of the members of a Multicast group. All of the members of the Multicast group, each having a unicast source address, transmit to a Multicast destination address. In this case, the aggregation criterion is defined at the value "multicastMember". In step E4 for analyzing the flow descriptions for flows coming from the client network, the pre-aggregator 51 determines as a flow characteristic the address of the unicast source situated in the client network and the multicast destination address. These characteristics are specific to the client network. In step E5, it transmits the Multicast destination address to the aggregator 60. In step E62 for aggregation of the flow descriptions for flows coming from the client network, the pre-aggregator 51 aggregates the flow descriptions for flows whose source and destination addresses correspond to the pair (unicast source address, multicast destination address) In step E7, the aggregator 60 configures pre-aggregators in charge of flow descriptions for flows coming from the core network by supplying them with the determined flow characteristic or characteristics and the aggregation criterion. In step E8, the pre-aggregators supply the filtered flow descriptions depending on the multicast destination address and conserving each source address. Based on this information, the application can determine the list of the source addresses transmitting in the same multicast group as the unicast source address of the client network and, consequently, the list of the members of the multicast group.

It will be noted that the method also works in the case where the nodes implement a sampling of the flows for the formation of the flow descriptions. The method then takes into account this information which can for example be present in the low-level flow descriptions or be known by configuration of the nodes.

The method is also applicable to the collection of flow descriptions on other types of client networks such as a virtual private network, a domestic network or a mobile network. It is particularly well adapted to the collection of flow descriptions for flows coming from any network attached to a higher-level interconnection network.

Figure 3:
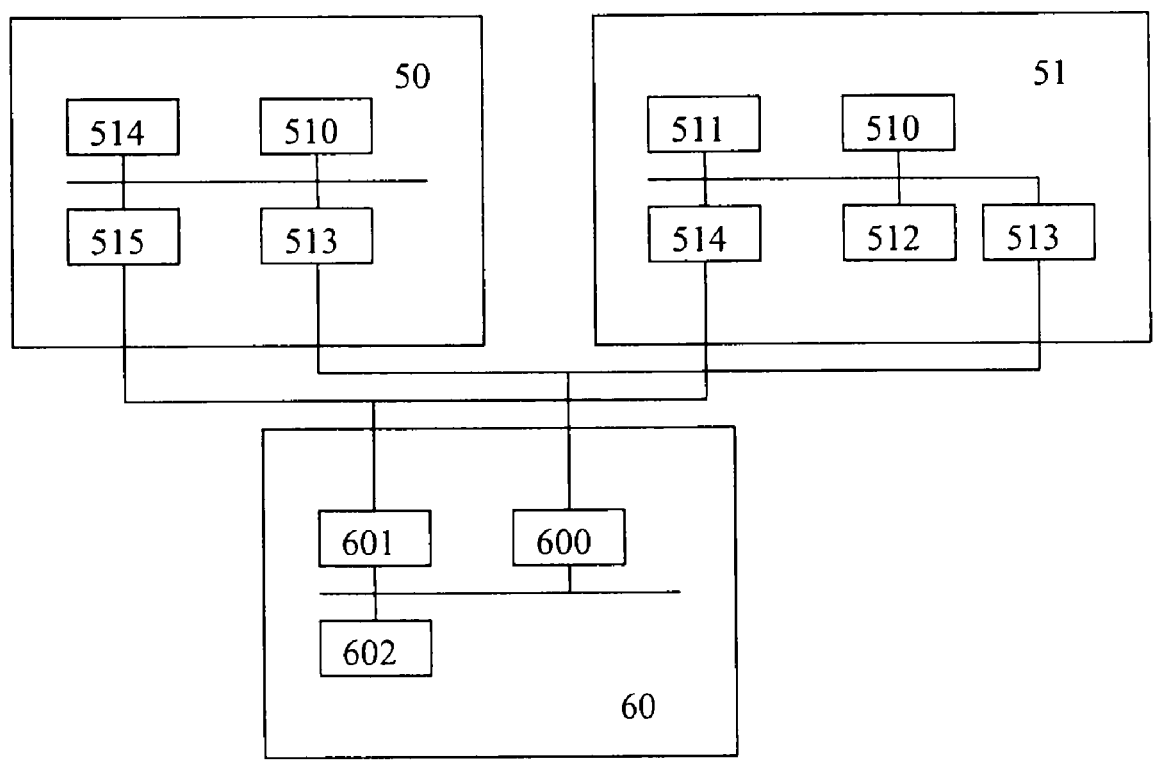
FIG. 3 shows a system for collection of flow descriptions.

The flow description collection system will now be described with reference to FIG. 3.

The collection system comprises the pre-aggregators 50, 51 and the aggregator 60.

Part of the pre-aggregator 51, having a function for aggregation of flow descriptions for flows coming from a client network, henceforth referred to as outgoing pre-aggregator, comprises the following modules:

- a flow description reception module 510, configured for receiving flow descriptions for flows coming from the client network;
- a flow description aggregation module 512, configured for aggregating received flow descriptions according to an aggregation criterion;
- a flow description analysis module 511, configured for analyzing flow descriptions for flows coming from the client network in order to determine at least one flow characteristic specific to the client network;
- a flow description transmission module 513, configured for transmitting filtered flow descriptions to an aggregator 60 or to a collection module 70;
- a configuration module 514, configured for receiving configuration information from an aggregator and for transmitting to the aggregator the flow characteristic determined.

Part of the pre-aggregator 50, having a function for aggregation of flow descriptions for flows coming from an interconnection network, henceforth referred to as incoming pre-aggregator, comprises the following modules:

- a configuration module 514, configured for receiving configuration information from an aggregator 60;
- a flow description reception module 510, configured for receiving flow descriptions for flows coming from the interconnection network;
- a flow description filtering module 515, configured for eliminating, in the flow descriptions received, those for flows lacking said at least one flow characteristic received by the configuration module 514;

a flow description transmission module 513, configured for transmitting filtered flow descriptions to an aggregator 60 or to a collection module 70.

Optionally, the incoming pre-aggregator 50 furthermore comprises a flow description aggregation module 512, configured for aggregating received flow descriptions according to an aggregation criterion. The flow descriptions are transmitted to it by the filtering module 515.

The aggregator 60 comprises the following modules:
- a flow description reception module 600, configured for receiving flow descriptions coming from incoming pre-aggregators and from outgoing pre-aggregators;
- a configuration module 601, configured for configuring the pre-aggregators and receiving the determined flow characteristic or characteristics from outgoing pre-aggregators;
- a flow description aggregation module 602, configured for aggregating aggregated flow descriptions received from outgoing pre-aggregators and aggregated flow descriptions received from incoming pre-aggregators.

Optionally, the collection system comprises one or more modules 516 for assigning to a flow description a parameter representative of a direction of transmission between a client and a server, upload direction from the client to the server and download direction from the server to the client, depending on the respective values of the source and destination ports contained in said flow description and the aggregation module is configured for aggregating the flow descriptions according to said parameter representative of the direction of transmission and to the aggregation criterion. This module can be integrated into either the pre-aggregators or the aggregator.

The modules, such as are described, are distributed over various machines, separate from the nodes 20, 30, 31. Alternatively, it is possible to provide all of the modules needed in the nodes or, as the case may be, only the modules provided in the pre-aggregators.

In another alternative, there is no aggregator. The outgoing pre-aggregator 51 transmits the configuration information and the determined flow characteristic(s) directly to the incoming pre-aggregator 50.

The modules 510 to 515 and 600 to 602, which implement the method previously described, are preferably software modules comprising software instructions for the execution of the steps of the method previously described by the server. The software modules can be stored in or transmitted by a data medium. The latter can be a hardware storage medium, for example a CD-ROM, a magnetic diskette or a hard disk, or else a transmission medium such as an electrical, optical or radio signal, or a telecommunications network.

APPENDIX

TABLE I

| AggrID | ClientID | NodeID | InterfaceID | AggrMode | Export address |
|---|---|---|---|---|---|
| Ag1 | Client1 | Node1 | Eth000001 | minPort PrefixSrc | 192.3.2.1 |
| Ag2 | Client2 | Node2 | Tunnel1 | minPort PrefixSrc | 192.3.2.2 |
| Ag2 | Client2 | Node3 | Vlan34 | minPort PrefixSrc | 192.3.2.3 |

TABLE II

| Exporter | If Index | Dest Addr | Source Addr | Src Port | Dst Port | Protocol | Src Mask | bytes | pkts |
|---|---|---|---|---|---|---|---|---|---|
| 192.3.2.1 | 1 | 1.2.3.4 | 156.100.140.5 | 12 | 3800 | TCP | 24 | 500 | 10 |
| 192.3.2.1 | 1 | 3.4.5.6 | 156.100.140.28 | 12 | 6600 | TCP | 24 | 500 | 10 |
| 192.3.2.1 | 1 | 8.2.3.1 | 156.100.140.24 | 12 | 7000 | TCP | 24 | 500 | 10 |
| 192.3.2.1 | 1 | 4.3.2.1 | 156.100.140.25 | 8000 | 12 | TCP | 24 | 2500 | 5 |
| 192.3.2.1 | 1 | 7.2.3.7 | 156.100.140.12 | 1730 | 161 | UDP | 24 | 5400 | 10 |
| 192.3.2.2 | 1 | 9.2.3.7 | 140.100.140.12 | 12 | 3400 | TCP | 24 | 500 | 10 |
| 192.3.2.2 | 1 | 23.2.3.7 | 140.100.140.9 | 12 | 6500 | TCP | 24 | 500 | 10 |
| 192.3.2.2 | 1 | 45.2.3.7 | 140.100.140.67 | 12 | 3200 | TCP | 24 | 500 | 10 |
| 192.3.2.2 | 1 | 86.2.3.7 | 140.100.140.48 | 5400 | 162 | UDP | 24 | 300 | 1 |
| 192.3.2.2 | 1 | 78.2.3.7 | 140.100.140.43 | 12 | 2000 | TCP | 24 | 500 | 10 |
| 192.3.2.3 | 1 | 9.2.3.7 | 140.100.140.12 | 12 | 2000 | TCP | 24 | 500 | 10 |
| 192.3.2.3 | 1 | 23.2.3.7 | 140.100.140.9 | 12 | 2000 | TCP | 24 | 500 | 10 |
| 192.3.2.3 | 1 | 45.2.3.7 | 140.100.140.67 | 12 | 2000 | TCP | 24 | 500 | 10 |
| 192.3.2.3 | 1 | 86.2.3.7 | 140.100.140.48 | 12 | 2000 | TCP | 24 | 500 | 10 |
| 192.3.2.3 | 1 | 78.2.3.7 | 140.100.140.43 | 12 | 2000 | TCP | 24 | 500 | 10 |
| 192.3.2.2 | 1 | 9.76.3.7 | 139.100.140.12 | 12 | 3400 | TCP | 24 | 500 | 10 |
| 192.3.2.2 | 1 | 48.2.3.7 | 139.100.140.9 | 12 | 6500 | TCP | 24 | 500 | 10 |
| 192.3.2.2 | 1 | 46.2.3.7 | 139.100.140.67 | 12 | 3200 | TCP | 24 | 500 | 10 |
| 192.3.2.2 | 1 | 35.2.3.7 | 139.100.140.48 | 12 | 5400 | TCP | 24 | 500 | 10 |
| 192.3.2.2 | 1 | 98.2.3.7 | 139.100.140.43 | 12 | 2000 | TCP | 24 | 500 | 10 |
| 192.3.2.3 | 1 | 9.76.3.7 | 139.100.140.12 | 12 | 2000 | TCP | 24 | 500 | 10 |
| 192.3.2.3 | 1 | 48.2.3.7 | 139.100.140.9 | 12 | 2000 | TCP | 24 | 500 | 10 |
| 192.3.2.3 | 1 | 46.2.3.7 | 139.100.140.67 | 12 | 2000 | TCP | 24 | 500 | 10 |
| 192.3.2.3 | 1 | 35.2.3.7 | 139.100.140.48 | 12 | 2000 | TCP | 24 | 500 | 10 |
| 192.3.2.3 | 1 | 98.2.3.7 | 139.100.140.43 | 12 | 2000 | TCP | 24 | 500 | 10 |

TABLE III

| AggrID | ClientID | Exporter | AggrMode | Network | Netmask | AS |
|---|---|---|---|---|---|---|
| Ag1 | Client1 | 192.3.2.1 | minPort PrefixSrc | 156.100.140.0 | 24 | — |
| Ag2 | Client2 | 192.3.2.2 | minPort PrefixSrc | 139.100.140.0 | 24 | — |
| Ag2 | Client2 | 192.3.2.3 | minPort PrefixSrc | 139.100.140.0 | 24 | — |
| Ag2 | Client2 | 192.3.2.2 | minPort PrefixSrc | 140.100.140.0 | 24 | — |
| Ag2 | Client2 | 192.3.2.3 | minPort PrefixSrc | 140.100.140.0 | 24 | — |

TABLE IV

| Exporter | If Index | Dest Addr | Source Addr | Port | Direction | Protocol | Src Mask | bytes | pkts |
|---|---|---|---|---|---|---|---|---|---|
| 192.3.2.1 | 1 | 1.2.3.4 | 156.100.140.5 | 12 | 0 | TCP | 24 | 500 | 10 |
| 192.3.2.1 | 1 | 3.4.5.6 | 156.100.140.28 | 12 | 0 | TCP | 24 | 500 | 10 |
| 192.3.2.1 | 1 | 8.2.3.1 | 156.100.140.24 | 12 | 0 | TCP | 24 | 500 | 10 |
| 192.3.2.1 | 1 | 4.3.2.1 | 156.100.140.25 | 12 | 1 | TCP | 24 | 2500 | 5 |
| 192.3.2.1 | 1 | 7.2.3.7 | 156.100.140.12 | 161 | 1 | UDP | 24 | 5400 | 10 |
| 192.3.2.2 | 1 | 9.2.3.7 | 140.100.140.12 | 12 | 0 | TCP | 24 | 500 | 10 |
| 192.3.2.2 | 1 | 23.2.3.7 | 140.100.140.9 | 12 | 0 | TCP | 24 | 500 | 10 |
| 192.3.2.2 | 1 | 45.2.3.7 | 140.100.140.67 | 12 | 0 | TCP | 24 | 500 | 10 |
| 192.3.2.2 | 1 | 86.2.3.7 | 140.100.140.48 | 162 | 1 | UDP | 24 | 300 | 1 |
| 192.3.2.2 | 1 | 78.2.3.7 | 140.100.140.43 | 12 | 0 | TCP | 24 | 500 | 10 |
| 192.3.2.3 | 1 | 9.2.3.7 | 140.100.140.12 | 12 | 0 | TCP | 24 | 500 | 10 |
| 192.3.2.3 | 1 | 23.2.3.7 | 140.100.140.9 | 12 | 0 | TCP | 24 | 500 | 10 |
| 192.3.2.3 | 1 | 45.2.3.7 | 140.100.140.67 | 12 | 0 | TCP | 24 | 500 | 10 |
| 192.3.2.3 | 1 | 86.2.3.7 | 140.100.140.48 | 12 | 0 | TCP | 24 | 500 | 10 |
| 192.3.2.3 | 1 | 78.2.3.7 | 140.100.140.43 | 12 | 0 | TCP | 24 | 500 | 10 |
| 192.3.2.2 | 1 | 9.76.3.7 | 139.100.140.12 | 12 | 0 | TCP | 24 | 500 | 10 |
| 192.3.2.2 | 1 | 48.2.3.7 | 139.100.140.9 | 12 | 0 | TCP | 24 | 500 | 10 |
| 192.3.2.2 | 1 | 46.2.3.7 | 139.100.140.67 | 12 | 0 | TCP | 24 | 500 | 10 |
| 192.3.2.2 | 1 | 35.2.3.7 | 139.100.140.48 | 12 | 0 | TCP | 24 | 500 | 10 |
| 192.3.2.2 | 1 | 98.2.3.7 | 139.100.140.43 | 12 | 0 | TCP | 24 | 500 | 10 |
| 192.3.2.3 | 1 | 9.76.3.7 | 139.100.140.12 | 12 | 0 | TCP | 24 | 500 | 10 |
| 192.3.2.3 | 1 | 48.2.3.7 | 139.100.140.9 | 12 | 0 | TCP | 24 | 500 | 10 |
| 192.3.2.3 | 1 | 46.2.3.7 | 139.100.140.67 | 12 | 0 | TCP | 24 | 500 | 10 |
| 192.3.2.3 | 1 | 35.2.3.7 | 139.100.140.48 | 12 | 0 | TCP | 24 | 500 | 10 |
| 192.3.2.3 | 1 | 98.2.3.7 | 139.100.140.43 | 12 | 0 | TCP | 24 | 500 | 10 |

TABLE V

| Exporter | AggrID | If Index | Nbflow | Source Addr | Port-Server | Direction | Protocol | Src Mask | bytes | pkts |
|---|---|---|---|---|---|---|---|---|---|---|
| 192.3.2.1 | Ag1 | 1 | 3 | 156.100.140.0 | 12 | 0 | TCP | 24 | 1500 | 30 |
| 192.3.2.1 | Ag1 | 1 | 1 | 156.100.140.0 | 12 | 1 | TCP | 24 | 2500 | 5 |
| 192.3.2.1 | Ag1 | 1 | 1 | 156.100.140.0 | 161 | 1 | UDP | 24 | 5400 | 10 |
| 192.3.2.2 | Ag2 | 1 | 4 | 140.100.140.0 | 12 | 0 | TCP | 24 | 2000 | 40 |
| 192.3.2.2 | Ag2 | 1 | 1 | 140.100.140.0 | 162 | 1 | UDP | 24 | 300 | 1 |
| 192.3.2.3 | Ag2 | 1 | 5 | 140.100.140.0 | 12 | 0 | TCP | 24 | 500 | 50 |
| 192.3.2.2 | Ag2 | 1 | 5 | 139.100.140.0 | 12 | 0 | TCP | 24 | 2500 | 50 |
| 192.3.2.3 | Ag2 | 1 | 5 | 139.100.140.0 | 12 | 0 | TCP | 24 | 2500 | 50 |

TABLE VI

| Exporter | If Index | DstAddr | SrcAddr | Src Port | Dst Port | Protocol | Dst Mask | bytes | pkts |
|---|---|---|---|---|---|---|---|---|---|
| 192.3.2.4 | 1 | 156.100.140.5 | 1.2.3.4 | 3800 | 12 | TCP | 24 | 4000 | 100 |
| 192.3.2.4 | 1 | 156.100.140.28 | 3.4.5.6 | 6600 | 12 | TCP | 24 | 4000 | 100 |
| 192.3.2.4 | 1 | 156.100.140.24 | 8.2.3.1 | 7000 | 12 | TCP | 24 | 4000 | 100 |
| 192.3.2.4 | 1 | 156.100.140.25 | 4.3.2.1 | 12 | 8000 | TCP | 24 | 10000 | 10 |
| 192.3.2.4 | 1 | 156.100.140.12 | 7.2.3.7 | 161 | 1730 | UDP | 24 | 8000 | 10 |
| 192.3.2.5 | 1 | 140.100.140.12 | 9.2.3.7 | 3400 | 12 | TCP | 24 | 4000 | 100 |
| 192.3.2.5 | 1 | 140.100.140.9 | 23.2.3.7 | 6500 | 12 | TCP | 24 | 4000 | 100 |
| 192.3.2.5 | 1 | 140.100.140.67 | 45.2.3.7 | 3200 | 12 | TCP | 24 | 4000 | 100 |
| 192.3.2.5 | 1 | 140.100.140.43 | 78.2.3.7 | 2000 | 12 | TCP | 24 | 4000 | 100 |
| 192.3.2.5 | 1 | 140.100.140.12 | 9.2.3.7 | 2000 | 12 | TCP | 24 | 4000 | 100 |
| 192.3.2.5 | 1 | 140.100.140.9 | 23.2.3.7 | 2000 | 12 | TCP | 24 | 4000 | 100 |
| 192.3.2.5 | 1 | 140.100.140.67 | 45.2.3.7 | 2000 | 12 | TCP | 24 | 4000 | 100 |
| 192.3.2.5 | 1 | 140.100.140.48 | 86.2.3.7 | 2000 | 12 | TCP | 24 | 4000 | 100 |
| 192.3.2.5 | 1 | 140.100.140.43 | 78.2.3.7 | 2000 | 12 | TCP | 24 | 4000 | 100 |
| 192.3.2.4 | 1 | 139.100.140.12 | 9.76.3.7 | 3400 | 12 | TCP | 24 | 4000 | 100 |
| 192.3.2.4 | 1 | 139.100.140.9 | 48.2.3.7 | 6500 | 12 | TCP | 24 | 4000 | 100 |
| 192.3.2.4 | 1 | 139.100.140.67 | 46.2.3.7 | 3200 | 12 | TCP | 24 | 4000 | 100 |
| 192.3.2.4 | 1 | 139.100.140.48 | 35.2.3.7 | 5400 | 12 | TCP | 24 | 4000 | 100 |
| 192.3.2.4 | 1 | 139.100.140.43 | 98.2.3.7 | 2000 | 12 | TCP | 24 | 4000 | 100 |
| 192.3.2.4 | 1 | 139.100.140.12 | 9.76.3.7 | 2000 | 12 | TCP | 24 | 4000 | 100 |
| 192.3.2.4 | 1 | 139.100.140.9 | 48.2.3.7 | 2000 | 12 | TCP | 24 | 4000 | 100 |
| 192.3.2.4 | 1 | 139.100.140.67 | 46.2.3.7 | 2000 | 12 | TCP | 24 | 4000 | 100 |
| 192.3.2.4 | 1 | 139.100.140.48 | 35.2.3.7 | 2000 | 12 | TCP | 24 | 4000 | 100 |
| 192.3.2.4 | 1 | 139.100.140.43 | 98.2.3.7 | 2000 | 12 | TCP | 24 | 4000 | 100 |

TABLE VII

| Exporter | Agrr ID | If Index | DstAddr | Nbflow | Src Port | Direction | Protocol | Dst Mask | bytes | pkts |
|---|---|---|---|---|---|---|---|---|---|---|
| 192.3.2.4 | Ag1 | 1 | 156.100.140.0 | 3 | 12 | 1 | TCP | 24 | 12000 | 300 |
| 192.3.2.4 | Ag1 | 1 | 156.100.140.0 | 1 | 12 | 0 | TCP | 24 | 10000 | 10 |
| 192.3.2.4 | Ag1 | 1 | 156.100.140.0 | 1 | 161 | 0 | UDP | 24 | 8000 | 10 |
| 192.3.2.5 | Ag1 | 1 | 140.100.140.0 | 9 | 12 | 1 | TCP | 24 | 36000 | 900 |
| 192.3.2.4 | Ag1 | 1 | 139.100.140.0 | 9 | 12 | 1 | TCP | 24 | 40000 | 1000 |

TABLE VIII

Activity toward servers external to the client network

| Aggr ID | Client network | Src Mask | Port server | Protocol | out Nb | Out Bytes | Out Pkts | InNb | In Bytes | In Pkts |
|---|---|---|---|---|---|---|---|---|---|---|
| Ag1 | 156.100.140.0 | 24 | 12 | TCP | 1 | 2500 | 5 | 3 | 10000 | 10 |
| Ag1 | 156.100.140.0 | 24 | 161 | UDP | 1 | 5400 | 10 | 1 | 8000 | 10 |
| Ag2 | 140.100.140.0 | 24 | 162 | UDP | 1 | 300 | 1 | 0 | 0 | 0 |

TABLE IX

Activity from the servers in the client network

| Aggr ID | Client network | Src Mask | Port server | Protocol | out Nb | Out Bytes | Out Pkts | InNb | In Bytes | In Pkts |
|---|---|---|---|---|---|---|---|---|---|---|
| Ag1 | 156.100.140.0 | 24 | 12 | TCP | 3 | 1500 | 30 | 3 | 12000 | 300 |
| Ag2 | 140.100.140.0 | 24 | 12 | TCP | 9 | 4500 | 90 | 10 | 36000 | 900 |
| Ag2 | 139.100.140.0 | 24 | 12 | TCP | 10 | 5000 | 100 | 10 | 40000 | 1000 |

The invention claimed is:

1. A method for collection of flow descriptions for flows relating to at least one client network, the client network being attached to an interconnection network, the method comprising:
   receiving first flow descriptions, the first flow descriptions associated with flows coming from the client network;
   analyzing the first flow descriptions associated with the flows coming from the client network to determine at least one flow characteristic specific to the client network;
   aggregating the first flow descriptions associated with the flows coming from the client network according to an aggregation criterion;
   transmitting the aggregated first flow descriptions to a collection device;
   receiving second flow descriptions, the second flow descriptions associated with flows coming from the interconnection network;
   filtering the second flow descriptions associated with the flows coming from the interconnection network, in which the second flow descriptions for flows lacking the at least one determined flow characteristic specific to the client network are eliminated; and
   transmitting the filtered second flow descriptions to the collection device,
   wherein the aggregating the first flow descriptions further comprises assigning to the aggregated flow descriptions a parameter for identification of an aggregation request, and
   the filtering the second flow descriptions further comprises assigning to the filtered second flow descriptions the same aggregation request identification parameter.

2. The method as claimed in claim 1, wherein, prior to the transmitting the filtered second flow descriptions, the method further comprises aggregating the filtered second flow descriptions according to the aggregation criterion.

3. The method as claimed in claim 2, the method further comprising:
   aggregating the aggregated first flow descriptions associated with the flows coming from the client network and the aggregated second flow descriptions coming from the interconnection network to obtain bi-directional aggregated flow descriptions before the transmitting the filtered second flow descriptions to the collection device.

4. The method as claimed in claim 2, further comprising:
   assigning to the first flow descriptions associated with the flows coming from the client network and to the second flow descriptions associated with the flows coming from the interconnection network a parameter representative of a direction of transmission between a client and a server, an upload direction being from the client to the server and a download direction being from the server to the client, depending on respective values of source and destination ports contained in the first and second flow descriptions, and
   aggregating, during the aggregating the first and second flow descriptions, the first and second flow descriptions are aggregated according to the parameter representative of the direction of transmission and to the aggregation criterion.

5. The method as claimed in claim 1, further comprising:
   assigning to the first flow descriptions associated with the flows coming from the client network and to the second flow descriptions associated with the flows coming from the interconnection network a timing parameter representative of a time distribution of the flow descriptions that have been aggregated.

6. The method according to claim 1, wherein the first flow descriptions specify an identification of an output interface, a number of packets included in the flows coming from the client network, a volume of IP layer octets in the flows coming from the client network, or start and end times of the flows coming from the client network.

7. A system for collection of flow descriptions for flows relating to at least one client network, the client network being attached to an interconnection network, the system comprising:
- at least one flow description reception device to receive flow descriptions associated with flows coming from one of the two networks, interconnection or client;
- at least one flow description aggregation device to aggregate the received flow descriptions as a function of an aggregation criterion;
- a flow description analysis device to analyze flow descriptions from the received flow descriptions associated with flows coming from the client network to determine at least one flow characteristic specific to the client network;
- a flow description filtering device to eliminate, within the received flow descriptions, those flows lacking the at least one determined flow characteristic;
- a flow description transmission device to transmit descriptions of filtered flows to a collection module;
- a device to assign to a flow description a parameter representative of a direction of transmission between a client and a server, an upload direction being from the client to the server and a download direction being from the server to the client, depending on respective values of source and destination ports contained in the flow descriptions; and
- the aggregation device further aggregates the flow descriptions according to the parameter representative of the direction of transmission and to the aggregation criterion.

8. The system as claimed in claim 7, further comprising:
- at least one aggregation device to aggregate descriptions of aggregated flows for flows coming from the client network and descriptions of aggregated flows coming from the interconnection network.

9. The system according to claim 7, wherein the first flow descriptions specify an identification of an output interface, a number of packets included in the flows coming from the one of the two networks, a volume of IP layer octets in the flows coming from the one of the two networks, or start and end times of the flows coming from the one of the two networks.

10. A system for collection of flow descriptions for flows relating to at least one client network, the client network being attached to an interconnection network, the system comprising:
- at least one flow description reception device to receive flow descriptions associated with flows coming from one of the two networks, interconnection or client;
- at least one flow description aggregation device to aggregate the received flow descriptions as a function of an aggregation criterion, the aggregated flow descriptions assigned a parameter for identification of an aggregation request;
- a flow description analysis device to analyze flow descriptions from the received flow descriptions associated with flows coming from the client network to determine at least one flow characteristic specific to the client network;
- a flow description filtering device to eliminate, within the received flow descriptions, those flows lacking the at least one determined flow characteristic, the filtered flow descriptions assigned the same aggregation request identification parameter; and
- a flow description transmission device to transmit descriptions of filtered flows to a collection module.

* * * * *